US 7,147,407 B2

(12) United States Patent
Satran

(10) Patent No.: US 7,147,407 B2
(45) Date of Patent: Dec. 12, 2006

(54) CUTTING INSERT AND CUTTING TOOL

(75) Inventor: Amir Satran, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 11/132,221

(22) Filed: May 19, 2005

(65) Prior Publication Data

US 2005/0214080 A1    Sep. 29, 2005

Related U.S. Application Data

(63) Continuation of application No. PCT/IL03/00909, filed on Nov. 3, 2003.

(30) Foreign Application Priority Data

Nov. 26, 2002   (IL)  .................................... 153093

(51) Int. Cl.
*B23C 5/20* (2006.01)
(52) U.S. Cl. ............................ 407/42; 407/48; 407/61; 407/113
(58) Field of Classification Search ................. 407/42, 407/48, 47, 61, 113; *B23C 5/20*
See application file for complete search history.

(56) References Cited

U.S. PATENT DOCUMENTS

| | | | | |
|---|---|---|---|---|
| 3,848,303 A | * | 11/1974 | Faber ............................ | 407/77 |
| 4,074,949 A | * | 2/1978 | Hochmuth et al. ........... | 407/114 |
| 4,294,566 A | * | 10/1981 | Boone ........................... | 407/114 |
| 4,946,318 A | * | 8/1990 | David et al. ................... | 407/42 |
| 5,122,017 A | * | 6/1992 | Niebauer ...................... | 407/114 |
| 5,324,144 A | * | 6/1994 | Katbi et al. ................... | 407/114 |
| 5,333,972 A | * | 8/1994 | Bernadic et al. ............. | 407/113 |
| 5,382,118 A | * | 1/1995 | Satran et al. .................. | 407/42 |
| 5,466,097 A | * | 11/1995 | Wallstrom ..................... | 407/113 |
| 5,593,255 A | * | 1/1997 | Satran et al. ................. | 407/113 |
| 5,839,858 A |  | 11/1998 | Paya et al. | |
| 6,293,737 B1 |  | 9/2001 | Satran et al. | |

FOREIGN PATENT DOCUMENTS

| | | |
|---|---|---|
| CA | 923288 | 3/1973 |
| DE | 28 11 086 | 3/1978 |
| EP | 1 002 608 | 11/1999 |
| EP | 1 157 768 | 3/2001 |
| GB | 1084975 | 11/1964 |

OTHER PUBLICATIONS

International Search Report, PCT/IL03/00909 dated Mar. 16, 2004.

(Continued)

*Primary Examiner*—Monica Carter
*Assistant Examiner*—Sara Addisu
(74) *Attorney, Agent, or Firm*—Womble Carlyle

(57) ABSTRACT

The present invention provides a cutting insert an indexable cutting insert, for use in a cutting tool for milling operations. The cutting insert is generally rhomboidal in shape having a peripheral side surface extending between and perpendicular to the two opposing end surfaces. A cutting edge section is associated with each end surface and comprises first and second cutting edges merging at a corner cutting edge. The two first cutting edges associated with each end surface, form a non-zero first angle with respect to a median plane of the cutting insert. The peripheral side surface comprises four generally flat major side surfaces, two diametrically opposing radiused corner side surfaces, and two diametrically opposing generally flat minor side surfaces. Each end surface is provided with a flat end region. The flat end regions are parallel and form axially outermost protruding regions of the cutting insert.

25 Claims, 5 Drawing Sheets

OTHER PUBLICATIONS

Written Opinion, PCT/IL03/00909.
Response to Written Opinion of Jun. 9, 2004, PCT/IL03/00909, dated Jul. 14, 2004.
Second Response to Written Opinion of Jun. 9, 2004.
Third Response to Written Opinion of Jun. 9, 2004.
Second Written Opinion, PCT/9L03/00909.
Third Response to Written Opinion of Oct. 14, 2004.
International Preliminary Examination Report, Dec. 17, 2004.

* cited by examiner

CUTTING INSERT AND CUTTING TOOL

RELATED APPLICATIONS

This is a Continuation of International Application No. PCT/IL03/00909, filed Nov. 3, 2003 and published in English as WO 2004/048021 A1 on Jun. 10, 2004. The contents of the above-identified international application are incorporated by reference.

FIELD OF THE INVENTION

This invention relates to a cutting insert and a cutting tool for metal cutting operations in general and for cutting small radius internal corners in particular and also for ramp down cutting operations.

BACKGROUND OF THE INVENTION

Such cutting tools, generally in the form of end mills and shell mills, are used in metal working applications in the manufacture of dies and molds and other structures having complex geometrical surfaces and extended shoulders. In these applications it is often required to produce internal corners of small radius, sometimes smaller than 0.5 mm. Generally, complex geometrical surfaces are produced in metal workpieces using ball nose end mills, or end mills with round cutting inserts. There are no ball nose end mills having replaceable cutting inserts that can produce internal corners having a radius as small as 0.5 mm. Also, there are no round cutting inserts having radii as small as 0.5 mm.

When working a large surface of a workpiece, the most economical approach is to use cutting tools having large radii cutting inserts in order to produce the main large scale features of the surface and then to use tools having small radius cutting capability for producing small scale features and for reducing the radii of internal corners where needed.

Cutting inserts having small radius cutting capability are usually rhomboidal in shape, having a cutting nose (or corner) with the required small radius. An example of such a cutting insert and associated cutting tool is disclosed in EP 1 157 768 A1. The cutting insert has a positive geometry and therefore only two cutting corners. DE 28 11 086 A1 discloses an indexable cutting insert for rotary milling machines, consisting of a parallelepiped-shaped body with a parallelogram-shaped cross-section with two faces lying opposite each other, with two edge faces lying between said faces and two front faces lying opposite each other, whereby the faces and the front faces intersect each other and form principal cutting edges, wherein the faces (11, 12) and the edge faces intersect at an angle of less than 90° and form edges (17, 18), a part whereof forms an ancillary cutting edge, whereas the remaining part is provided in the form of a recess (21, 22), which is designed to hold a clamping element, whereby each recess is made by means of smooth faces (23, 24), the extension whereof is limited by edges running parallel to the ancillary cutting edge.

It is an object of the present invention to provide a cutting insert having four cutting corners capable of cutting small radii internal corners in a workpiece. It is also an object of the present invention to provide a cutting tool such as an end mill capable of seating such a cutting insert.

It is a further object of the present invention to provide a cutting insert and a cutting tool, of the aforementioned kind, that is also capable of carrying out ramp down cutting operations.

SUMMARY OF THE INVENTION

The cutting insert and cutting tool of the present invention are designed for cutting metals and composites. Typically, the cutting insert is manufactured by form-pressing and sintering carbide powders. However, injection-molding techniques can also be used.

In accordance with the present invention there is provided an indexable cutting insert, for use in a cutting tool for milling operations, comprising:

- two identical generally rhomboidal opposing end surfaces;
- a peripheral side surface extending between the two opposing end surfaces, the peripheral side surface being perpendicular to a median plane of the cutting insert and comprising six component side surfaces, four of the component side surfaces being generally flat major side surfaces and two of the component side surfaces being diametrically opposing radiused corner side surfaces, each corner side surface being located between and merging with the two major side surfaces;
- two first cutting edges and two second cutting edges associated with each end surface, each first cutting edge forming a non-zero first angle with respect to the median plane and each second cutting edge forming a non-zero second angle with respect to the median plane, the two first cutting edges associated with a given end surface being skew to each other and being located in associated major side surfaces that are parallel to each other, and the two second cutting edges associated with a given end surface being skew to each other and being located in associated major side surfaces that are parallel to each other;
- two corner cutting edges associated with each end surface, each corner cutting edge merging with one first cutting edge and with one second cutting edge and forming therewith a continuous cutting edge section;
- two opposing flat end regions, one flat end region associated with each end surface, the median plane being parallel to each flat end region;
- a through bore extending between the flat end regions, the through bore having an axis defining an axial direction of the cutting insert, the flat end regions forming axially outermost protruding regions of the cutting insert.

If desired, the first angle is different from the second angle.

Further if desired, the first angle is equal to the second angle.

If desired, the peripheral side surface further comprises two diametrically opposing generally flat minor side surfaces, each minor side surface being located between two major side surfaces.

Quite generally, the cutting insert has 180° rotational symmetry about each of first, second and third axes of rotational symmetry, the first axis being perpendicular to the flat end regions and coinciding with the axis of the through bore, the second axis passing through the minor side surfaces and the third axis passing through the corner side surfaces.

Preferably, each end surface comprises a rake surface associated with each cutting edge section, the rake surface extending from the cutting edge section inwards towards the median plane.

Further preferably, the rake surface merges along a join with a rise that slopes upwardly from the join away from the median plane.

Yet further preferably, the rise associated with a given end surface extends from the join to the flat end region of the given end surface.

Also in accordance with the present invention there is provided a cutting tool for milling operations, the cutting tool having an axis of rotation A and comprising:

a plurality of indexable cutting inserts in accordance with the present invention, each cutting insert being seated in an insert pocket with an operative first cutting edge positioned at a given axial rake angle (γ).

Typically, the axial rake angle (γ) lies in the range of 0° to 5°.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
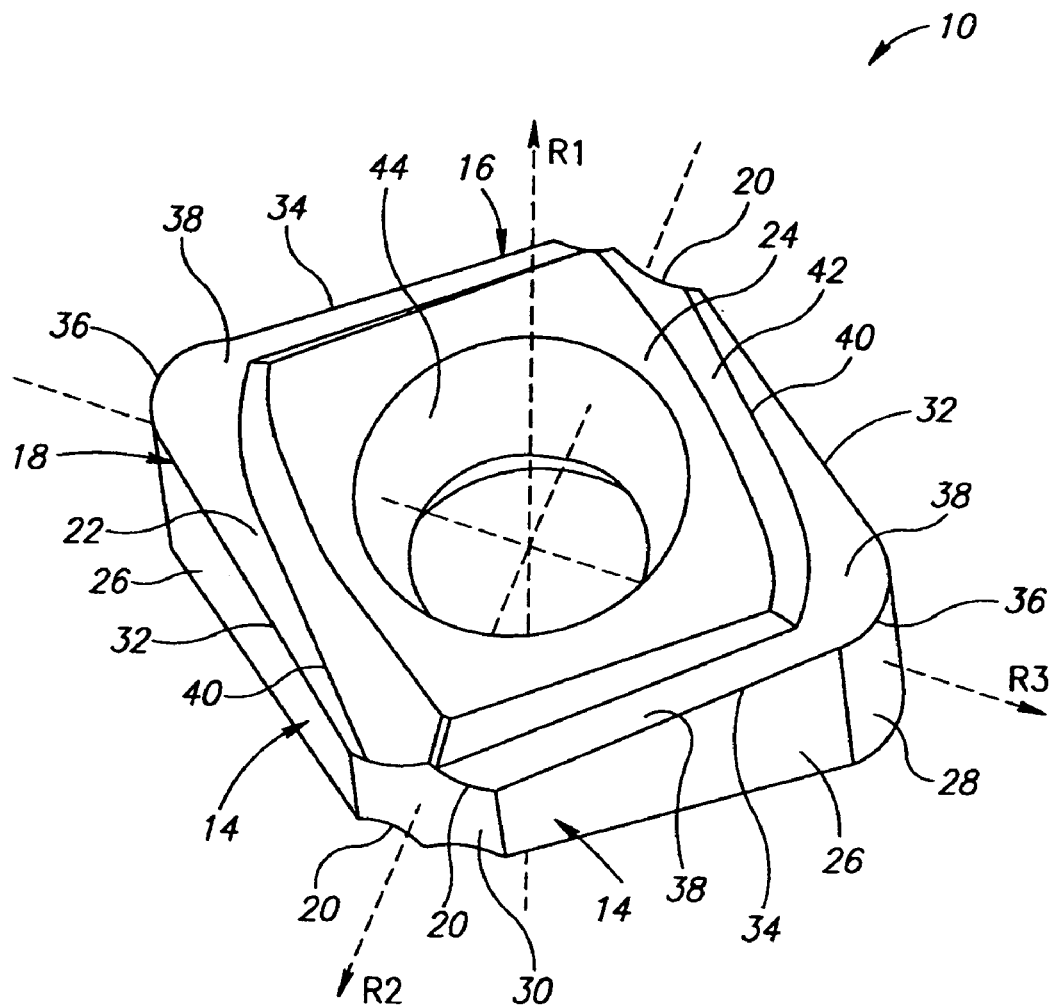
FIG. 1 is a perspective view of a cutting insert in accordance with the present invention.

Attention is first drawn to FIGS. 1 to 4 showing an indexable cutting insert 10 in accordance with the present invention. The cutting insert 10 has two identical generally rhomboidal opposing end surfaces 12 with a peripheral side surface 14 extending therebetween. Each end surface 12 is bounded by a peripheral edge 16 at which the end surface 12 and the peripheral side surface 14 merge. Each peripheral edge 16 comprises two continuous cutting edge sections 18 separated by two non-cutting edge sections 20. Adjacent each cutting edge section 18 is a groove 22 which borders a generally flat end region 24 of the end surface 12. Therefore, the cutting insert 10 has two opposing flat end regions 24. The two opposing flat end regions 24 are parallel to each other and to a median plane M of the cutting insert 10 which is located midway between the flat end regions 24.

The peripheral side surface 14 is perpendicular to the median plane M and comprises eight component side surfaces, namely, four generally flat major side surfaces 26, two diametrically opposing radiused corner side surfaces 28 and two diametrically opposing generally flat minor side surfaces 30. Each minor side surface 30 is located between and merges with the two major side surfaces 26. Similarly, each corner side surface 28 is located between and merges with the two major side surfaces 26.

Each cutting edge section 18 comprises a first cutting edge 32, a second cutting edge 34 and a corner cutting edge 36 at which the first and second cutting edges 32,34 merge.

Figure 3:
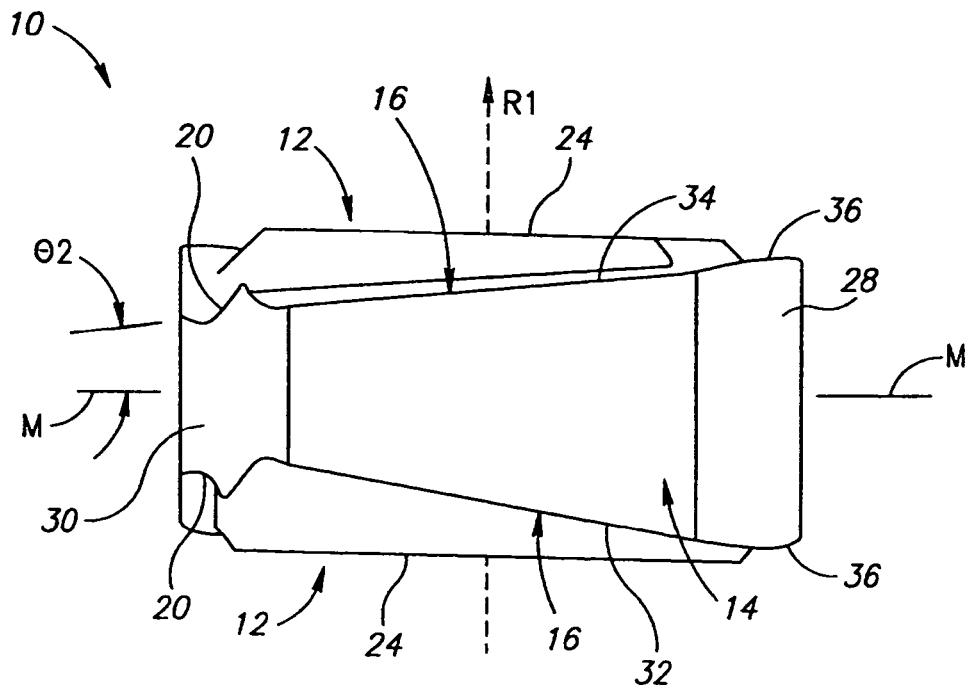
FIG. 3 is a side view of the cutting insert shown in FIG. 1.
Figure 4:
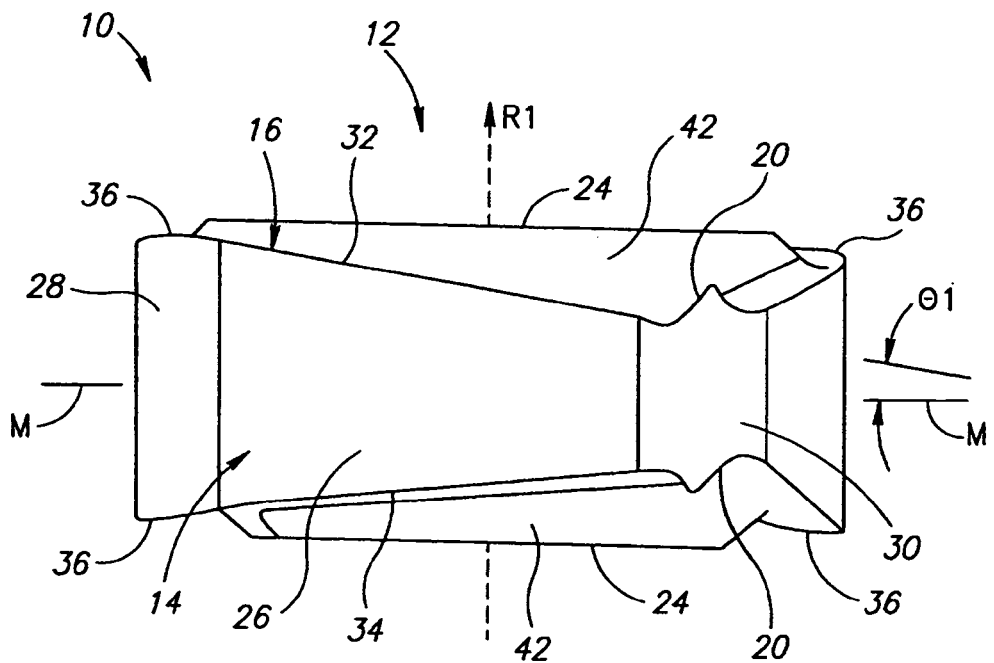
FIG. 4 is another side view of the cutting insert shown in FIG. 1.
Figure 5A:
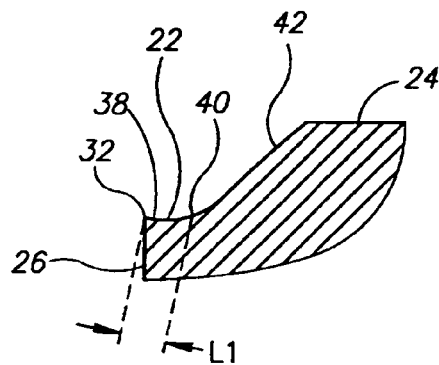
FIG. 5A is a partial cross-sectional view of the cutting insert shown in FIG. 2 taken along the line VA—VA.
Figure 5B:
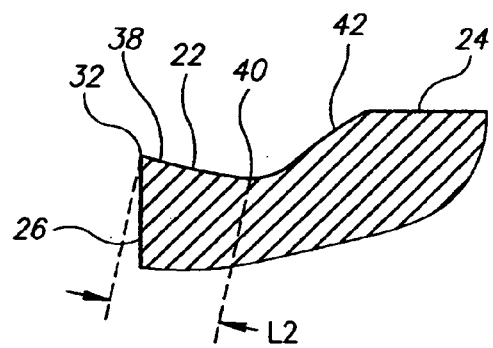
FIG. 5B is a partial cross-sectional view of the cutting insert shown in FIG. 2 taken along the line VB—VB.
Figure 5C:
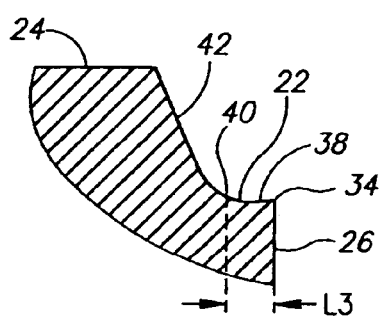
FIG. 5C is a partial cross-sectional view of the cutting insert shown in FIG. 2 taken along the line VC—VC.
Figure 5D:
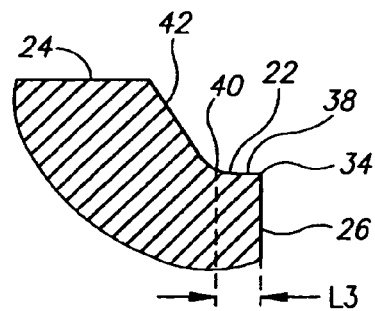
FIG. 5D is a partial cross-sectional view of the cutting insert shown in FIG. 2 taken along the line VD—VD.

Each first cutting edge 32 extends away from the corner cutting edge 36 with which it merges to an adjacent non-cutting edge section 20 and towards the median plane M. The first cutting edge 32 is preferably straight and is inclined at a non-zero first angle θ1 with respect to the median plane M. Similarly, each second cutting edge 34 extends away from the corner cutting edge 36 with which it merges to an adjacent non-cutting edge section 20 and towards the median plane M. The second cutting edge 34 is preferably straight and is inclined at a non-zero second angle θ2 with respect to the median plane M. The first and second angles θ1, θ2 can be equal or non-equal to each other. As best seen in FIGS. 3 and 4, each of the major side surfaces 26 includes one of the first cutting edges 32 and one of the second cutting edges 34. The first cutting edge 32 and the second cutting edge 34 associated with the same major side surface 26 extend from proximate a common corner side surface 28 towards the median plane M. The two first cutting edges 32 associated with a given end surface 12 being skew to each other and being located in associated major side surfaces 26 that are parallel to each other, and the two second cutting edges 34 associated with a given end surface 12 being skew to each other and being located in associated major side surfaces 26 that are parallel to each other The flat minor side surfaces 30 form a pair of diametrically opposed flat corners of the cutting insert 10.

Figure 2:
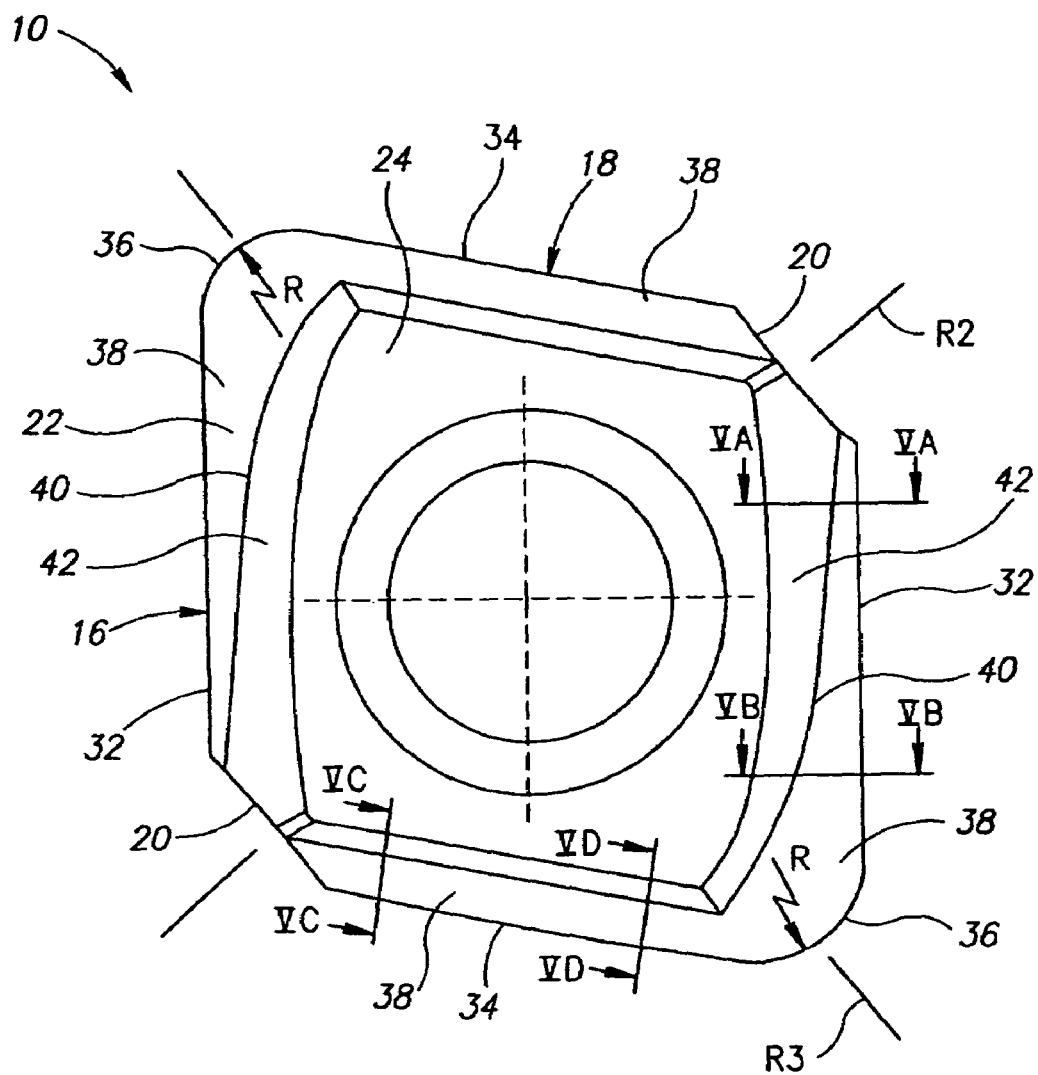
FIG. 2 is an end view of the cutting insert shown in FIG. 1.

Each end surface 12 comprises a rake surface 38 adjacent each cutting edge section 18. The rake surface 38 extends from the cutting edge section 18 inwards towards the median plane M to a join 40 where it merges with a rise 42 that slopes from the join 40 away from the median plane M to the flat end region 24. As can be seen in FIGS. 2 and 5A to 5D, the rake surface 38 adjacent the first cutting edge 32 has a variable length (measured perpendicular to the first cutting edge 32) along the cutting edge. It has a first length L1 (at cross-section VA—VA) near to an adjacent non-cutting edge 20 and a second length L2 (at cross-section VB—VB) near to an adjacent corner cutting edge 36, where the second length L2 is greater than the first length L1 and continuously varies between these two values along the cutting edge. On the other hand, the rake surface 38 adjacent with the second cutting edge 34 has a third length L3 which is approximately constant along the length of the second cutting edge 34. For the sake of clarity it is pointed out that the line shown as the join 40 in FIGS. 1 and 2 is only illustrative. It will be apparent from FIGS. 5A to 5D that the join 40 is actually a curved region of finite width forming part of the groove 22.

The cutting insert 10 has 180° rotational symmetry about first, second and third axes of rotational symmetry R1, R2, R3. The first axis R1 is perpendicular to the flat end regions 24, the second axis R2 passes through the minor side surfaces 30 and the third axis R3 passes through the corner side surfaces 28. The second and third axes R2, R3 lie in the median plane M and the first axis R1 is perpendicular to the second and third axes R2, R3. The cutting insert 10 is provided with a through bore 44 having as axis the first axis of rotational symmetry R1. The through bore 44 extends between the flat end regions 24 and defines an axial direction of the cutting insert. It should be noted from the side views of the cutting insert 10 in FIGS. 3 and 4 that the cutting insert 10 is widest in the axial direction of the cutting insert 10 at regions where the flat end regions 24 are directly opposite each other. In other words, the flat end regions 24 form axially outermost protruding regions of the cutting insert 10. Typically, the radius R of the corner cutting edges 36 is in the range 0.2 to 6.35 mm.

Figure 6:
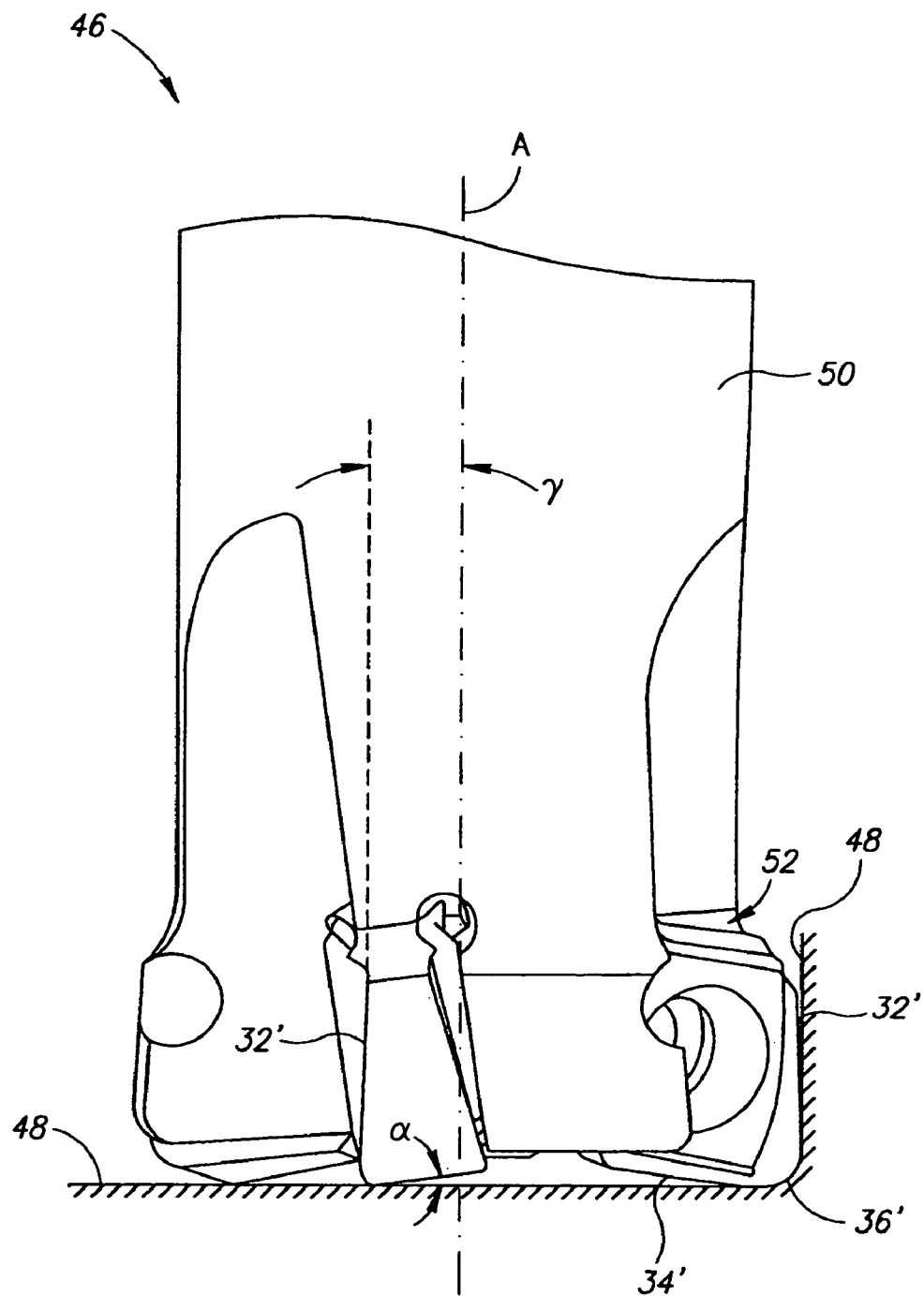
FIG. 6 is a side view of a cutting tool in accordance with the present invention.

Attention is now drawn to FIG. 6 showing a cutting tool 46 in accordance with the present invention. The cutting tool 46 is an end mill capable of cutting small radii internal corners in a workpiece 48 in accordance with the value of the radius R of the corner cutting edges 36. The cutting tool 46 is also capable performing ramp down cutting operations by means of the second cutting edge 34. The cutting tool 46 has an axis of rotation A and comprises a cutter body 50 with the indexable cutting inserts 10 in accordance with the present invention seated in insert pockets 52 of the cutter body 50. Each cutting insert 10 has two effective operative cutting edges, one operative first cutting edge 32' and one operative second cutting edge 34', and one operative corner cutting edge 36'. The insert pockets 52 are so designed that the operative first cutting edge 32' is positioned with an axial rake angle γ of typically close to 0° but generally no larger that 5°. Since the operative first cutting edge 32' makes a first angle θ1 with respect to the median plane M of the cutting insert 10 an inherent back clearance α typically close to θ1 but generally no less than θ1−5° is obtained between the cutting insert 10 and portions of the surface of the workpiece 48 adjacent the operative second cutting edge 34'.

The operative first cutting edge 32' can be divided into a leading portion adjacent the operative cutting corner 36', a trailing portion distal the operative cutting corner 36' and an intermediate portion therebetween. In cutting operations involving the production of internal small radius corners in a workpiece, such as in the manufacture of dies and molds, it is mainly the operative cutting corner 36' that is involved in the cutting operation. It will be appreciated that even if the leading portion of the operative first cutting edge 32' also participates in such cutting operations, the groove 22 should extend adjacent the whole length of the operative first cutting edge 32' from the leading portion to trailing portion, in order to provide clearance between the end surface 12 adjacent the trailing portion of the operative first cutting edge 32' and the workpiece 48. It will also be appreciated that if instead of the flat minor side surfaces 30 the cutting insert were to have corners protruding beyond the flat minor side surfaces 30, then that part of the cutting insert protruding beyond the flat minor side surfaces 30 associated with the operative first cutting edge 32' would disadvantageously enter the cutting circle defined by the operative first cutting edge 32'. This is especially important when working in the region of extended shoulders and also in ramp up cutting operations.

Although the present invention has been described to a certain degree of particularity, it should be understood that various alterations and modifications can be made without departing from the spirit or scope of the invention as hereinafter claimed.

The invention claimed is:

1. An indexable cutting insert, for use in a cutting tool for milling operations, comprising:

two identical generally rhomboidal opposing end surfaces;

a peripheral side surface extending between the two opposing end surfaces, the peripheral side surface being perpendicular to a median plane of the cutting insert and comprising six component side surfaces, four of the component side surfaces being generally flat major side surfaces and two of the component side surfaces being diametrically opposing radiused corner side surfaces, each corner side surface being located between and merging with two adjacent major side surfaces;

two first cutting edges and two second cutting edges associated with each end surface, each first cutting edge forming a non-zero first angle with respect to the median plane and each second cutting edge forming a non-zero second angle with respect to the median plane, the two first cutting edges associated with a given end surface being skew to each other and being located in associated major side surfaces that are parallel to each other, and the two second cutting edges associated with a given end surface being skew to each other and being located in associated major side surfaces that are parallel to each other;

two corner cutting edges associated with each end surface, each corner cutting edge merging with one first cutting edge and with one second cutting edge and forming therewith a continuous cutting edge section;

each of the four major side surfaces includes one of said first cutting edges and one of said second cutting edges, said one of said first cutting edges and said one of said second cutting edges extending from proximate a common corner side surface towards the median plane;

two opposing flat end regions, one flat end region associated with each end surface, the median plane being parallel to each flat end region;

a through bore extending between the flat end regions, the through bore having an axis defining an axial direction of the cutting insert, the flat end regions forming axially outermost protruding regions of the cutting insert.

2. An indexable cutting insert according to claim 1, wherein the first angle is different from the second angle.

3. An indexable cutting insert according to claim 1, further comprising two diametrically opposing generally flat minor side surfaces, each minor side surface being located between two major side surfaces.

4. An indexable cutting insert according to claim 3, wherein the cutting insert has 180° rotational symmetry about each of first, second and third axes of rotational symmetry, the first axis being perpendicular to the flat end regions and coinciding with the axis of the through bore, the second axis passing through the minor side surfaces and the third axis passing through the corner side surfaces.

5. An indexable cutting insert according to claim 1, wherein each end surface comprises a rake surface associated with each cutting edge section, the rake surface extending from the cutting edge section inwards towards the median plane.

6. An indexable cutting insert according to claim 5, wherein the rake surface merges along a join with a rise that slopes upwardly from the join away from the median plane.

7. An indexable cutting insert according to claim 6, wherein the rise associated with a given end surface extends from the join to the flat end region of the given end surface.

8. A cutting tool for milling operations, the cutting toot having an axis of rotation and comprising:

a plurality of indexable cutting inserts, each cutting insert being sealed in an insert pocket with an operative first cutting edge positioned at a given axial rake angle, wherein each cutting insert comprises:

two identical generally rhomboidal opposing end surfaces;

a peripheral side surface extending between the two opposing end surfaces, the peripheral side surface being perpendicular to a median plane of the cutting insert and comprising six component side surfaces, four of the component side surfaces being generally flat major side surfaces and two of the component side surfaces being diametrically opposing radiused corner side surfaces, each corner side surface being located between and merging with two adjacent major side surfaces;

two first cutting edges and two second cutting edges associated with each end surface, each first cutting edge forming a non-zero first angle with respect to the median plane and each second cutting edge forming a non-zero second angle with respect to the median plane, the two first cutting edges associated with a given end surface being skew to each other and being located in associated major side surfaces that are parallel to each other, and the two second cutting edges associated with a given end surface being skew to each other and being located in associated major side surfaces that are parallel to each other;

two corner cutting edges associated with each end surface, each corner cutting edge merging with one first cutting edge and with one second cutting edge and forming therewith a continuous cutting edge section;

each of the four major side surfaces includes one of said first cutting edges and one of said second cutting edges, said one of said first cutting edges and said one of said second cutting edges extending from proximate a common corner side surface towards the median plane;

two opposing flat end regions, one flat end region associated with each end surface, the median plane being parallel to each flat end region;

a through bore extending between the flat end regions, the through bore having an axis defining an axial direction of the cutting insert, the flat end regions forming axially outermost protruding regions of the cutting insert.

9. A tuning tool according to claim 8, wherein the axial take angle lies in the range of 0° to 5°.

10. An indexable cutting insert comprising:

two identical generally rhomboidal opposing end surfaces;

a peripheral side surface extending between the two opposing end surfaces, the peripheral side surface comprising first and second pairs of parallel major side surfaces and diametrically opposing first and second radiused corner side surfaces, a first pair of adjacent major side surfaces being joined by the first radiused corner side surface and a second pair of adjacent major side surfaces being joined by the second radiused corner side surface; wherein:

each end surface comprises first and second continuous cutting edge sections, each cutting edge section comprising a first cutting edge that forms a non-zero first angle with respect to a median plane of the cutting insert, a second cutting edge that forms a non-zero second angle with respect to the median plane of the cutting insert, and a corner cutting edge that merges with the first and second cutting edges;

the first cutting edges of the first and second cutting edge sections are skewed relative to each other and are located in the first pair of parallel major side surfaces;

the second cutting edges of the first and second cutting edge sections are skewed relative to each other and are located in the second pair of parallel major side surface;

each of the major side surfaces includes one of said first cutting edges and one of said second cutting edges, said one of said first cutting edges and said one of said second cutting edges extending from proximate a common corner side surface towards the median plane; and the cutting insert is provided with a total of four such continuous cutting edge sections.

11. An indexable cutting insert according to claim 10, wherein the first angle is different from the second angle.

12. An indexable cutting insert according to claim 10, further comprising two diametrically opposing generally flat minor side surfaces, each minor side surface being located between two major side surfaces.

13. An indexable cutting insert according to claim 10, further comprising:

two opposing flat end regions, one flat end region associated with each end surface, the median plane being parallel to each flat end region; and a through bore extending between the flat end regions, the through bore having an axis defining an axial direction of the cutting insert, the flat end regions forming axially outermost protruding regions of the cutting insert.

14. An indexable cutting insert according to claim 13, wherein the cutting insert has 180° rotational symmetry about each of first, second and third axes of rotational symmetry, the first axis being perpendicular to the flat end regions and coinciding with the axis of the through bore, the second axis passing through the minor side surfaces and the third axis passing through the corner side surfaces.

15. An indexable outing insert according to claim 13, wherein each end surface comprises a rake surface associated with each cutting edge section, the rake surface extending from the cutting edge section inwards towards the median plane.

16. An indexable cutting insert according to claim 13, wherein the rake surface merges along a join with a rise that slopes upwardly from the join away from the median plane.

17. An indexable cutting insert according to claim 13, wherein the rise associated with a given end surface extends from the join to the flat end region of the given end surface.

18. An indexable cutting insert comprising:

two identical opposing end surfaces;

a peripheral side surface extending between the two opposing end surfaces, the peripheral side surface comprising first and second pairs of parallel major side surfaces and diametrically opposing first and second radiused corner side surfaces, a first pair of adjacent major side surfaces being joined by the first radiused corner side surface and a second pair of adjacent major side surfaces being joined by the second radiused corner side surface; wherein:

the peripheral side surface further comprises two diametrically opposing generally flat minor side surfaces, each minor side surface being located between two major side surfaces;

each end surface comprises first and second continuous cutting edge sections, each cutting edge section comprising a first cutting edge that forms a non-zero first angle with respect to a median plane of the cutting insert, a second cutting edge that forms a non-zero second angle with respect to the median plane of the cutting insert, and a corner cutting edge that merges with the first and second cutting edges;

the first cutting edges of the first and second cutting edge sections are skewed relative to each other and are located in the first pair of parallel major side surfaces;

the second cutting edges of the first and second cutting edge sections are skewed relative to each other and are located in the second pair of parallel major side surface; and the cutting insert is provided with a total of four such continuous cutting edge sections.

19. The indexable cutting insert according to claim 18, further comprising a through bore extending between the end surfaces.

20. The indexable cutting insert according to claim 18, wherein the end surfaces are generally rhomboidal.

21. An indexable cutting insert comprising:
two identical opposing end surfaces;
a peripheral side surface extending between the two opposing end surfaces, the peripheral side surface comprising first and second pairs of parallel major side surfaces and diametrically opposing first and second radiused corner side surfaces, a first pair of adjacent major side surfaces being joined by the first radiused corner side surface and a second pair of adjacent major side surfaces being joined by the second radiused corner side surface; wherein:
each end surface comprises first and second continuous cutting edge sections, each cutting edge section comprising a first cutting edge that forms a non-zero first angle with respect to a median plane of the cutting insert, a second cutting edge that forms a non-zero second angle with respect to the median plane of the cutting insert, and a corner cutting edge that merges with the first and second cutting edges;
each of the major side surfaces includes one of said first cutting edges and one of said second cutting edges, said one of said first cutting edges and said one of said second cutting edges extending from proximate a common corner side surface towards the median plane; and
the cutting insert is provided with a total of four such continuous cutting edge sections.

22. The indexable cutting insert according to claim 21, further comprising a through bore extending between the end surfaces.

23. The indexable cutting insert according to claim 21, wherein the end surfaces are generally rhomboidal.

24. The indexable cutting insert according to claim 21, further comprising two diametrically opposing generally flat minor side surfaces, each minor side surface being located between two major side surfaces.

25. The indexable cutting insert according to claim 20, wherein:
the first cutting edges of the first and second cutting edge sections are skewed relative to each other and are located in the first pair of parallel major side surfaces; and
the second cutting edges of the first and second cutting edge sections are skewed relative to each other and are located in the second pair of parallel major side surface.

* * * * *